United States Patent [19]
Gabbay et al.

[11] Patent Number: 4,780,900
[45] Date of Patent: Oct. 25, 1988

[54] RADIOGENIC TUBE RADIOLOGICAL DEVICE WITH MAGNETIC BEARINGS

[75] Inventors: Emile Gabbay, Paris; André Plessis, Issy les Moulineaux, both of France

[73] Assignee: Thomson-CGR, Paris, France

[21] Appl. No.: 854,966

[22] Filed: Apr. 23, 1986

[30] Foreign Application Priority Data

May 7, 1985 [FR] France ................... 85 06963

[51] Int. Cl.⁴ .................................. H01J 35/10
[52] U.S. Cl. .................................. 378/132; 378/93; 378/125; 378/144
[58] Field of Search ............... 378/125, 131, 132, 133, 378/143, 144, 93

[56] References Cited

U.S. PATENT DOCUMENTS

| | | | |
|---|---|---|---|
| 3,878,395 | 4/1975 | Seifert et al. | 378/132 |
| 4,107,535 | 8/1978 | Kotabe et al. | 250/406 |
| 4,167,671 | 9/1979 | Boden et al. | 378/132 |
| 4,360,734 | 11/1982 | Dietz et al. | 378/93 |

Primary Examiner—Carolyn E. Fields
Assistant Examiner—David P. Porta
Attorney, Agent, or Firm—Pollock, VandeSande & Priddy

[57] ABSTRACT

A radiological device is provided of the type comprising a radiogenic tube with magnetic bearings, said radiogenic tube being contained in a sheath as well as electronic means for controlling said magnetic bearings.

9 Claims, 2 Drawing Sheets

RADIOGENIC TUBE RADIOLOGICAL DEVICE WITH MAGNETIC BEARINGS

BACKGROUND OF THE INVENTION

The present invention relates to a radiological device with a radiogenic tube of the magnetic bearing type, applicable to the general field of radio diagnosis.

In radiological devices X rays are produced from the rotating anode of a radiogenic tube. The anode is rotated by a drive motor comprising a rotor disposed inside the radiogenic tube along the rotational axis of the anode, and including a stator disposed concentrically with the rotor and outside the envelope of the radiogenic tube.

The high voltage required for operation of the radiogenic tube, supplied by a high voltage generator, is brought to the radiogenic tube by cables having a high level of electrical insulation; the negative polarity being applied to the cathode of the radiogenic tube and the positive polarity being applied to the anode.

Generally, the negative polarity is referenced to ground or the mass, as well as a protective sheath containing the radiogenic tube. The cable feeding the positive polarity penetrates into this sheath, in which it is connected to a connecting pin of the radiogenic tube, this pin is electrically connected to the anode.

For the motors driving the anode in rotation, whose rotor is suspended by mechanical means, such as ball bearings, it is conventional to apply the positive polarity of the high voltage to the rotor, this positive polarity is transmitted to the rotating anode through a metal shaft connecting the rotor and the anode together; the stator is fed at a low voltage reference to ground. We then find between the stator and the rotor the whole value of the positive high voltage, this value reaching high levels (85 KV). The electrical insulation is ensured by an assembly of dielectrics formed more particularly by the glass of the envelope of the radiogenic tube, an insulating oil and an insulating screen, the vacuum formed in the radiogenic tube forming an additional insulation. This assembly of dielectrics passes more particularly into the space between the stator and the rotor, which space forms the air gap of the drive motor for the anode.

Drive motors of the type whose rotor rotates on the ball bearings have the drawback of relatively rapid deterioration due to the mechanical wear of these ball bearings. Thus, manufactures tend to replace this type of mechanical suspension by suspensions of the magnetic bearing type.

Magnetic bearings are formed by an assembly of stators, each having a certain number of independent electromagnets, through which a controlled current flows so that the rotor is balanced under the influence of the electromagnetic forces. This balanced position, called nominal position, is determined by means of detectors which permanently record the position of the rotor. The signals generated by these detectors allow the current flowing through the electromagnets to be modified automatically and consequently the force of the magnetic fields. The current modification occurs through an electronic servocontrol system to which each electromagnet and each detector are connected.

A considerable drawback to the use of magnetic bearing motors resides in the large number of electric connections (a few tens of conductors) which connect the servo control electronics to the elements which it controls, which form a hindrance since the sheath containing the radiogenic tube is generally mobile.

On the other hand, the correct operation of the magnetic bearing motor requires the air gap (between the rotor and the stator) to be very small, which makes it difficult or impossible to provide the necessary electric insulation between the stators and the rotors with respect to the high voltage.

A known solution consists in isolating the rotor electrically with respect to the rotating anode: since the rotating anode is connected to the positive pole of the high voltage, it is mechanically secured to the rotor, for its rotation, by means of an insulating shaft made for example from alumina; the rotor is then referenced to the ground as well as the stators.

This solution to the problem of electric insulation comprises a serious drawback which resides in the mechanical fragility of this insulating shaft, considering the high rotational speeds and the high temperatures to which this insulating shaft is subjected.

SUMMARY OF THE INVENTION

The aim of the invention is to reduce the complexity of supplying a magnetic bearing radiogenic tube to the simplicity in supplying a conventional radiogenic tube.

This is obtained in the present invention by a new arrangement, which considerably reduces the number of wires fastened to the sheath, on the outside thereof; this arrangement further simplifies the problems of electric insulation between the rotor and the stators while maintaining for the support shaft, serving to secure the rotor and the rotating anode, the mechanical qualities of robustness required for reliable operation.

According to the invention, a radiogenic tube radiological device with magnetic bearings comprises a sheath containing said radiogenic tube, said radiogenic tube includes a rotating anode coupled mechanically to a rotor driven in rotation by a drive stator, said rotor being disposed along a longitudinal axis and its suspension being provided by means of said magnetic bearings controlled by servo control means. The radiological device specifically comprises:

a high voltage generator disposed outside said sheath and supplying the high supply voltage for said radiogenic tube, a first low voltage source disposed outside said sheath and supplying said servo control means, a second low voltage source disposed outside said sheath and supplying said drive stator; said servo control means generating the voltages required for operation of each of said magnetic bearings, said rotating anode being connected to the positive polarity of the high voltage through an electric cable with high electric insulation, is characterized in that said servo control means are contained in said sheath and are connected to said first low voltage source by a first and second conductor.

An important advantage of this arrangement is that it further overcomes the problems of electric insulation between the stators and the rotor, by connecting them to substantially identical potentials, such as the positive polarity of the high voltage, while keeping, as in an installtion comprising a conventional radiogenic tube, a single high electric insulation cable conveying the positive polarity of the high voltage for the radiogenic tube.

BRIEF DESCRIPTION OF THE DRAWINGS

The invention will be better understood from the following description, given by way of non-limitative example, and the two accompanying Figures in which.

DETAILED DESCRIPTION OF THE INVENTION

Figure 1:
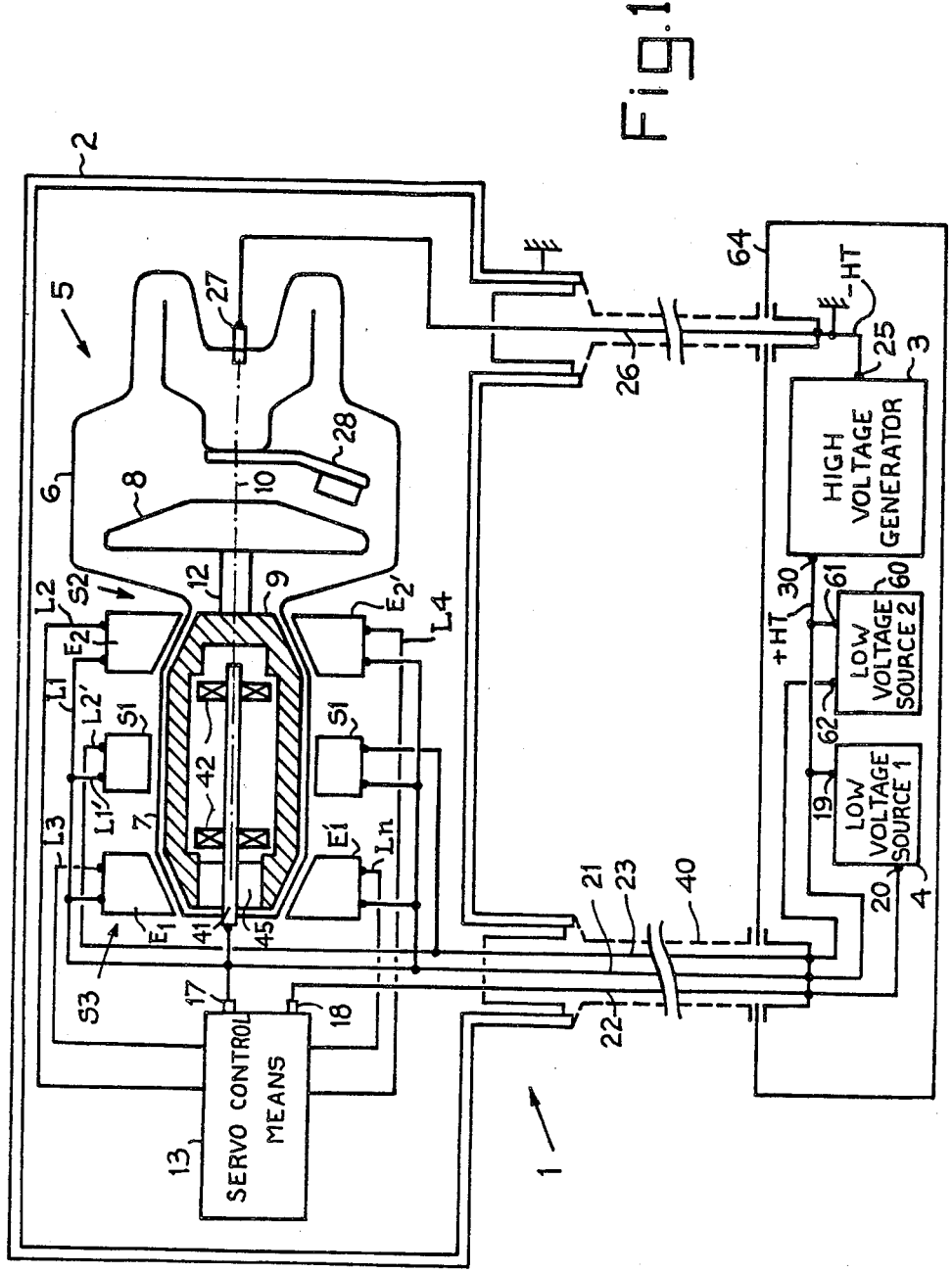
FIG. 1 shows schematically a preferred version of the radiological device of the invention.

FIG. 1 shows schematically a radiological device 1 in accordance with the invention, comprising more particularly a sheath 2 containing a radiogenic tube 5, a high voltage generator 3 delivering the high supply voltage for the radiogenic tube 5 and first and second low voltage sources 4, 60.

The radiogenic tube 5 comprises, in an envelope 6–7, a rotating anode 8 coupled for rotation with a rotor 9. Rotor 9 is disposed along a longitudinal axis 10 about which it rotates the rotating anode 8, to which it is secured by a support shaft 12.

Rotor 9 cooperates for its rotation and suspension with a first stator S1, serving particularly for driving it in rotation, and with second and third stators S2, S3 controlled by electronic servo control means 13. The second and third stators S2, S3 form the magnetic bearings properly speaking, of a type known per se, ensuring suspension of the rotor 9 and whose power supply is provided by the servocontrol means 13, which are themselves fed from the first low voltage source 4; the first drive stator S1 being supplied by the second low voltage source 60. In the non-limitative example described, the second and third stators form conical bearings, situated on the same side with respect to the rotating anode 8; the invention is also applicable in the case of bearings of another type.

As was explained above in the preamble, the second and third magnetic bearing stators S2, S3 each comprises electromagnet poles; these electromagnet poles are generally four in number per stator, disposed two by two along radial axes. In the example shown in FIG. 1, and for simplifying this Figure, the second and third stators S2, S3 are each represented only by two electromagnets respectively E1, E1', E2, E2' disposed in the plane of the Figure.

The action of the electromagnets E1, E1', E2, E2' is conventionally controlled by the electronic servo control means 13, using information supplied by position sensors (not shown) which each electromagnet includes in a conventional fashion.

This leads to a very high number n of electric connections L1, L2, L3, . . . , Ln, connecting the electronic servo control means 13 to the second and third stators S2, S3; this number may reach 38 for example, by counting connections L1', L2' required for supplying the first drive stator S1.

In the prior art, these connections L1, . . . Ln extend through sheath 2 so as to connect the stators S1, S2, S3 situated in sheath 2 to the electronic servo control means 13 themselves situated outside this sheath. Because of the space they occupy, these connections form a considerable hindrance, which is increased by the fact that the sheath is mobile; this latter condition further requiring particular precautions so as to maintain the mechanical quality of the wires.

In the present invention, these problems are avoided by the fact that the electronic servo control means 13 are disposed in the sheath 2 itself, which limits the number of wires extending through sheath 2. The electronic servo control means 13 generally comprise means (not shown) required for elaborating the different operating voltages, from a low voltage source, alternating for example, represented by the first source 4. Thus, the wires extending through sheath 2 for this purpose may be limited to two, as in the example described where a first and a second supply input 17, 18 of the electronic servo control means 13 are connected to a first and a second output 19, 20 of the low voltage source 4, respectively by a first and a second conductor 21, 22. Furthermore, since the first drive stator S1 is referenced to the same potential as the magnetic bearings or stators S2, S3, it only requires, in the example described, a third conductor 23 extending through sheath 2 for supplying the first stator S1; a first connection L1' proper to this latter being connected to the other connection L1 common to the magnetic bearings S2, S3 and its second connection L2' being connected through the third conductor 23 to the second low voltage source 60.

A novel and important advantage of this arrangement is that it brings a particularly interesting solution to the problems raised by the electric insulation between the rotor 9, stators S1, S2, S3 and the rotating anode 8.

In the invention, the electric insulation problem is solved by bringing the stators S1, S2, S3 and rotor 9 to potentials identical to that of the rotating anode 8, i.e. substantially to the positive +HT polarity of the high voltage.

This solution is made possible in the radiological device 1 of the invention because the electronic servo control means 13 are disposed in sheath 2.

In fact, assuming that such a solution had been envisaged with a radiological device of the prior art, comprising a magnetic bearing radiogenic tube whose electronic servocontrol means are disposed outside the sheath, for supplying the stators S1, S2, S3 with the high positive voltage the electronic servo control means 13 would have to be referenced to the positive high voltage and all the connections L1, L2, . . . Ln to be formed using high electric insulation cables. Such cables, although expensive, are currently used in industry but the number of conductors which they comprise is limited to three or four. It would then be necessary to use at least ten high electric insulation cables for connecting the electronic control means and the sheath. It is evident such a solution is neither practical from the point of view of use, nor from the point of view of cost, nor feasibility.

On the contrary, in the radiological device 1 of the invention, the stators S1, S2, S3 are brought to the positive high voltage +HT by means of a single high electric insulation cable 40 of conventional type, shown with broken lines, comprising three conductors 21, 22, 23.

The high voltage for supplying the radiogenic tube is supplied by the high voltage generator 3, a first output terminal 25 which delivers the negative polarity −HT. The first output terminal 25 is connected, through a fourth conductor 26 and a sealed passage 27 through the radiogenic tube 5, to the cathode 28 thereof; sheath 2 being in the non-limitative example described connected to the first output terminal 25, i.e. to −HT and to ground. The positive polarity of the high voltage +HT is delivered by a second terminal 30 of the high voltage generator 3.

In the non-limitative example shown, the second terminal 30, i.e. the positive polarity +HT is connected to the first output 19 of the first low voltage source 4 and to a third output 61 of the second source 60, so as to reference these low voltage sources 4, 60 to the positive potential +HT of the high voltage. Thus, the first second and third conductors 21, 22, 23 are contained in the high electric insulation cable 40 and allow the servo control means 13 to be supplied by the first and second conductors 21, 23 and the drive stator S1 to the supplied by the first and third conductors 21, 23; the third conductor 23 being connected to a fourth output 62 belonging to the second low voltage source 60. It should be noted that the first conductor 21 is common to these two power supplies and that further it transports the positive polarity +HT of the high voltage.

With this configuration, as in the example described, the high voltage generator 3, and the first and second sources 4, 60 may be incorporated in the same insulated tank 64.

In the non-limitative example described, rotor 9 is hollow and rotates about a fixed shaft 41 having guard bearings 42 on which the rotor 9 bears, when it is not balanced under the action of the second and third stators S2, S3. In the non-limitative example described, the positive polarity +HT of the high voltage, transported by the first conductor 21, is connected to the fixed shaft 41 for supplying the radiogenic tube 5 with power. This positive polarity +HT is then transmitted to rotor 9, through a conventional type transmission device 45, comprising for example slip contact means (not shown), or means for generating an electron beam.

With rotor 9 being at the positive polarity +HT of the high voltage, or at a low voltage very close thereto, because of a possible voltage drop due to the transmission device 45, this high positive voltage +HT is transmitted to the anode 8 through the support shaft 12, this latter being made from metal.

With the magnetic bearings or stators S2, S3 controlled by the electronic servo control means 13, they are, in the same way as these latter, brought to the positive potential +HT of the high voltage or to a closely related potential. Thus, for the sake of clarity in the Figure, the connections L1, L1' representing one of the connections of the electromagnets E1, E1', E2, E2' and of the drive stators S1 are connected directly to the first input terminal 17 of the electronic servo control means 13, i.e. to the first conductor 21 and to the fixed shaft 41.

Figure 2:
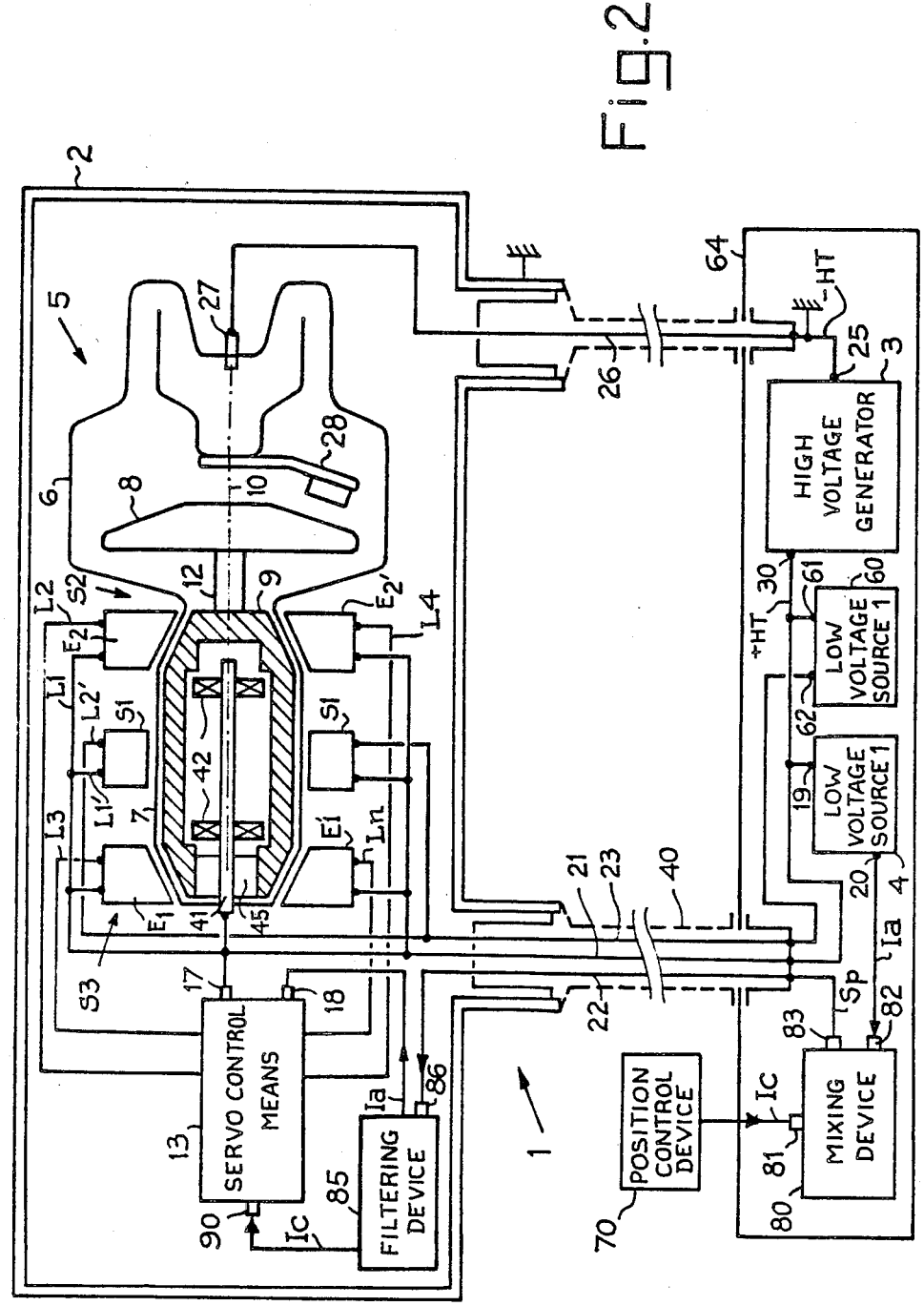
FIG. 2 shows a second version of the invention for adjusting the axial position of the rotor.

FIG. 2 shows a variant of the invention comprising additional control means, for controlling the position of rotor 9 along the longitudinal axis 10 with respect to a reference value created outside sheath 2 and to a potential close to that of ground.

As was explained above, it is desirable not to increase, in a radiological installation, the number of electric cables such as electric cable 40, while keeping for this latter a number of conductors 21, 22, 23 limited to three or four (the fourth conductor not being shown).

The serve control means comprise conventionally an external control input 90 for controlling the axial position of rotor 9.

The external control input 90 may be connected to a position control device 70 either directly (not shown) through the fourth conductor for example if cable 40 comprises four conductors, or by means of the third conductor 23 or the second conductor 22, further using a mixing device 80 and a filtering device 85; this latter solution allowing an electric cable 40 to be used with three conductors 21, 22, 23 as in the example described where it is the second conductor 22 which is used for this purpose.

In the non-limitative example described, the solution consists in superimposing, on a supply current Ia corresponding to the power supply for the servo control means 13, a reference current Ic generated by the control device 70 and having a frequency different from the frequency of the supply current Ia.

For this, the position control device 70 delivers the reference current Ic which is applied to a first mixing input 81 of the mixing device 80, to which is applied, at a second mixing input 82, the supply current Ia delivered by the second output 20 of the first low voltage source 4; the mixing device 80 being, in the non-limitative example described, disposed in the isolating tank 64 and being formed conventionally for superimposing the two currents Ia, Ic and having electric insulation characteristics compatible between the high positive voltage and ground.

The mixing device 80 delivers through an output 83, the superimposition signal SP which is transmitted into sheath 2 through the second conductor 22 and which is applied to an input 86 of the filtering device 85 disposed on sheath 2. The filtering device 85 conventionally separates the reference current Ic which is applied to external control input 90 and the supply current Ia which is applied to the second input 18 of the servo control means 13. Such a combination may be reproduced for feeding into the radiogenic tube 5, possibly simultaneously, other electric signals (not shown) by using one or more of the conductors 22, 23 other than the common conductor, which is formed in the example described by the first conductor 21.

This description forms a non-limitative example of a radiological device 1 of the invention, in which the electric power supply for a magnetic bearing radiogenic tube is considerably simplified, by disposing in the sheath 2 containing the radiogenic tube 5 the electronic servo control means 13 for controlling the magnetic bearings. This first simplification is accompanied by another important simplification of electric insulation problems arising through use of magnetic bearings while maintaining, between the rotor 9 and the rotating anode 8, a metal support shaft 12 having qualities or robustness appropriate to reliable operation.

What is claimed is:

1. A radiogenic tube radiological device with magnetic bearings, comprising a sheath containing said radiogenic tube, said radiogenic tube comprising a rotating anode coupled mechanically to a rotor driven in rotation by a drive stator, said rotor being disposed along a longitudinal axis and its suspension being provided by means of magnetic bearings controlled by servo control means, said radiological device comprising: a high voltage generator disposed outside said sheath delivering the high supply voltage for said radiogenic tube, a first low voltage source disposed outside said sheath and supplying said servo control means with power, a second low voltage source disposed outside said sheath and supplying said drive stator with power; said servo control means delivering the voltages required for the operation of each of said magnetic bearings, said rotating anode being connected to the positive polarity of the high voltage through an electric cable with high electric insulation, wherein said magnetic bearings and said drive stator are contained within said sheath, said servo control means are contained in said sheath and are connected to said first low voltage source by a first and a second conductor, wherein said drive stator and said magnetic bearings are referenced to an identical potential and are both connected to said second low voltage source by said first conductor and by a third conductor, said first conductor common to said first and second low voltage sources.

2. The radiological device as claimed in claim 1, wherein said first conductor is further connected to the positive polarity of the high voltage, so as to reference said electronic servo control means, said magnetic bearings and said drive stator to said positive polarity.

3. The radiological device as claimed in claim 1, wherein the first, second and third conductors are contained in said high electric insulation cable and said first conductor is connected to an output of said high voltage generator delivering the positive polarity and forms a conductor common to the low voltage power supplies for said electronic servo control means and for said drive stator and to the application of said positive polarity of the high voltage to said rotating anode.

4. The radiological device as claimed in claim 1, wherein said rotating anode is coupled for rotating with said rotor by a metal support shaft.

5. The radiological device as claimed in claim 4, wherein said rotating anode is connected to said positive polarity by means of said rotor and said metal support shaft.

6. The radiological device as claimed in claim 1, characterized in that said high voltage generator and said low voltage sources are disposed in the same insulating tank.

7. The radiological device as claimed in claim 1, wherein said electric cable with high electric insulation comprises a number of conductors less than or equal to four.

8. The radiological device as claimed in claim 7, further comprising an axial position control device generating a reference current for controlling the position of said rotor along said longitudinal axis, said reference current being applied to an external control input comprised by said servo control means through said electric cable with high electric insulation.

9. The radiological device as claimed in claim 8, further comprising a mixing device connected on the one hand to said axial position control device and receiving said reference current and connected on the other hand to said first low voltage source for receiving a supply current corresponding to the power supply for said servo control means, said reference and supply currents having different frequencies, said mixing device delivering a superimposition signal transmitted into said sheath through said second conductor, said superimposition signal being applied to a filtering device separating said reference current from said supply current.

* * * * *